Feb. 4, 1958 A. M. CASABONA 2,822,525

HIGH FREQUENCY HYBRID CIRCUIT

Filed Oct. 2, 1953

INVENTOR
ANTHONY M. CASABONA

BY
Ernest Fanwick
ATTORNEY

United States Patent Office 2,822,525

Patented Feb. 4, 1958

2,822,525

HIGH FREQUENCY HYBRID CIRCUIT

Anthony M. Casabona, North White Plains, N. Y., assignor to International Telephone and Telegraph Corporation, Nutley, N. J., a corporation of Maryland Application October 2, 1953, Serial No. 383,777

11 Claims. (Cl. 333—11)

Figure 1:
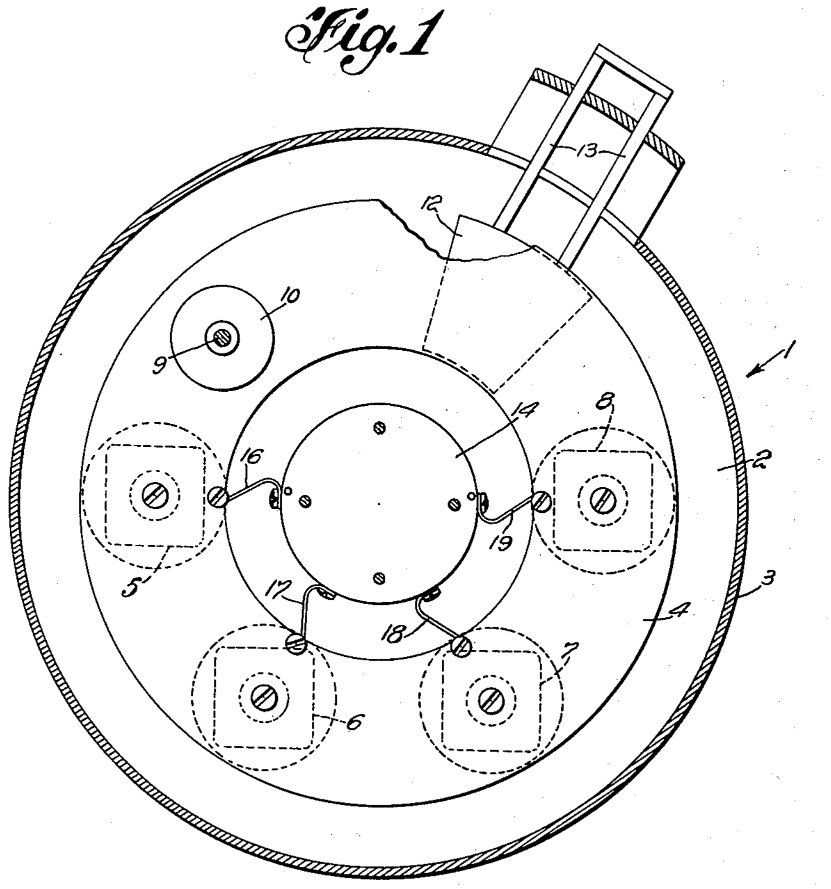

This invention relates to high frequency units and more particularly to high frequency hybrid circuits. Due to the extreme simplicity of this system, as well as its relatively broad frequency bandwidth, this invention is particularly useful when dealing with extremely high frequencies, for example, in the neighborhood of 1000 megacycles.

There are many possible microwave circuits designed to couple together circuits in a conjugate manner similar in behavior to the conventional low frequency "hybrid coil" circuit used in wire telephony to isolate signals traveling in different directions on the same wires. One device which is similar in behavior to a "magic T" hybrid junction, when arranged to have the same characteristic impedance at all four terminals, has been called a ring circuit and has been constructed of waveguides, coaxial lines, even open wire transmission lines. Such circuits heretofore known have been extremely frequency sensitive and therefore have been incapable of operating over a relatively wide frequency bandwidth since the spacing between arms of the circuit could not materially depart from one-quarter wavelength. Using multiples of one-quarter wavelength only tended to make the circuit even more highly frequency sensitive. At extremely high frequencies the construction of such a hybrid circuit from coaxial transmission lines became very difficult due to the short length of coaxial line necessitated by the quarter wavelength spacing. In addition, previously known hybrid circuits have been extremely difficult to tune to a predetermined frequency.

One of the objects of this invention, therefore, is to provide a high frequency hybrid circuit capable of operating over a relatively wide frequency band.

Another object of this invention is to provide a high frequency hybrid circuit which is extremely easy to manufacture.

A further object of this invention is to provide a high frequency hybrid circuit capable of being very accurately and easily tuned to a predetermined frequency within a relatively wide frequency bandwidth.

A feature of this invention is the provision of a coaxial hybrid circuit having a conductive ground plane above which there is mounted an annular conductive surface. Coaxial transmission lines having their outer conductors coupled to the ground plane and their inner conductors extending through the conductive ground plane and coupled to the annular surface are properly disposed to form the arms of the hybrid circuit. A center post coupled to the ground plane is disposed centrally of the annular surface and prevents coupling between the arms of the hybrid circuit.

Another feature of this invention is the provision of a tuning disk and/or tuning vane whose spacing relative to the annular surface may be controlled to compensate for changes in frequency beyond the normal balanced range of the circuit.

Figure 2:
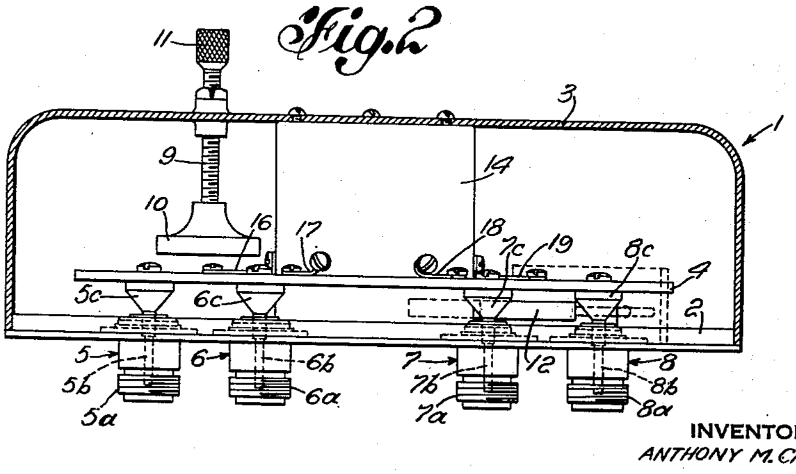

The above-mentioned and other features and objects of this invention will become more apparent by reference to the following description taken in conjunction with the accompanying drawing, in which:

Fig. 1 is a plan view partly in cross section of the high frequency hybrid circuit of this invention; and Fig. 2 is a view in elevation of the high frequency hybrid circuit shown in Fig. 1, with the cover therefor shown in section.

Referring to Figs. 1 and 2 of the drawing, the high frequency hybrid circuit in accordance with the principles of this invention is shown therein to comprise a metallic housing unit 1 including a ground plane or planar conductor plate 2 and a cover 3. Above the ground plane conductor 2 is a conductive surface or annular conductor plate 4. Coupled to the ground plane conductor 2 there are provided a plurality of coaxial transmission line terminal coupling units 5, 6, 7 and 8 whose outer conductors *5a*, *6a*, *7a* and *8a* are connected directly to the planar conductor 2 and whose inner conductors *5b*, *6b*, *7b* and *8b* extend through openings in the planar conductor and are coupled to the annular plate 4 by means of conical enlargements *5c*, *6c*, *7c* and *8c*. The annular plate 4 is so constructed that the segment between terminal units 5 and 8 is of one-half wavelength greater length at the operating frequency than the spacing between any other two adjacent terminals in order to provide a desired phase reversal.

Considering now the condition when the hybrid circuit is operating at its highest designed frequency, it is obvious that for optimum operation the spacing between adjacent terminal units 5 and 6, 6 and 7, and 7 and 8 should be equal to one-quarter wavelength whereas the distance around the annular plate 4 between terminal units 5 and 8 should be of one-half wavelength greater length than the one-quarter wavelength spacing between other adjacent terminal units. If each of the arms of the hybrid circuit terminated by coupling units 5, 6, 7 and 8 is of equal impedance then a signal coupled to input terminal 5 will be coupled out of terminals 6 and 8 since the input signal will divide and follow two paths around the annular ring 4 and the signals from each path will arrive at terminals 6 and 8 in phase, whereas no signal will be coupled out of terminal 7 since the input signal will divide in being transmitted around the annular plate 4 and arrive at terminal unit 7 out of phase and thus cancel. This is in accordance with well-known hybrid junction theory and no further detailed explanation is believed necessary.

In the cover 3 of the bridge circuit of this invention a threaded rod 9 is provided which carries a tuning disk 10 within the housing 3 and having a control knob 11 external to the housing 3. By rotating control knob 11 the tuning disk 10 effectively changes the spacing of ground plane conductor 2 relative to the annular plate 4 and thus can compensate in frequencies beyond the normal balanced range of the hybrid circuit when the capacitance is changed on the segment of the annular plate 4 containing the additional half wavelength distance between terminals 5 and 8.

Alternately, or in addition to tuning disk 10, a tuning vane 12 may be provided. The vane 12 is moved between planar conductor 2 and annular plate 4 to vary the capacitance in the segment between terminals 5 and 8 having the additional 180° distance and thus add additional capacitance and effectively change the spacing between plates 2 and 4. The vane 12 may be composed of a conductive material and mounted on rods 13 which would electrically couple the vane 12 to the housing and could thus vary the effective spacing of the plates 2 and 4. In the alternative the vane 12 may be composed of a dielectric and vary the capacitance by effectively varying the dielectric constant between plates 2 and 4.

One form of the hybrid circuit of this invention which

I have found to be satisfactory in the 1000 megacycle frequency range had the spacing between adjacent coaxial terminal units 5 and 6, 6 and 7, and 7 and 8 equal to one-quarter wavelength at the highest operating frequency and the spacing between terminal units 5 and 8 equal to three-quarter wavelength at the highest operating frequency. Of course, it must be realized that the hybrid circuit may be operated as a power divider and thus constructed with any spacing intermediate the terminal units 5—8 provided that an additional 180 degrees is inserted in one of the arms or that tuning means are available so that additional capacity can be added in the region of the additional one-half wavelength length segment, thereby effectively lengthening the greatest segment for lower frequency operation. A conductive post 14 is disposed in the center of the annular ring 4 and coupled to the cover 3. The conductive post 14 functions as a conductive barrier at ground potential to prevent abrupt departures from proper operation at certain frequencies within the operational bandwidth due to possible coupling between the various arms of the circuit. The spacing of the annular plate 4 above the planar conductor 2 and from post 14 is chosen to yield the desired characteristic impedance. It is obvious that dielectric spacers may be utilized to support the annular plate 4 instead of being supported on the inner conductors of the terminal units 5—8 as shown in the drawing. The inner conductors of the coupling units 5—8 are terminated by the tapered enlargements **5*c*—8*c* which function as coupling transformers to provide the proper impedance match. In order to overcome any mismatches introduced by the connection of the transmission lines to the bridges and to compensate for any discontinuity, matching stubs 16—19 are connected between the conductive center post 14 and the annular plate 4. The length of matching stubs 16—19 can be varied by coupling them to a higher position on the post 14**. By the use of proper spacing, transformers and matching stubs, it is possible to obtain a 50-ohm impedance match at the input of the hybrid circuit when the circuit is terminated with a 50-ohm load.

Tests of the hybrid circuit have indicated that the voltage radially across the annular plate 4 remains the same, indicating that the wave travel must be at a higher speed on the outer circumference of the annular surface 4 than at the inner circumference. I have found that with this bridge operating in the frequency range of 960–1215 megacycles, a difference in frequency of 130 megacycles can be accommodated using 20 db below input level at the out-of-phase corner as the minimum criterion for balance. This degree of unbalance can be further minimized by varying the capacitance in the larger segment of the bridge arms by means of tuning disk 10 or tuning vane 12.

It is, of course, understood that the hybrid circuit of this invention may take other forms, such as rectangular, and provide substantially the same fine balance as the circuit herein shown.

While I have described above the principles of my invention in connection with specific apparatus, it is to be clearly understood that this description is made only by way of example and not as a limitation to the scope of my invention as set forth in the objects thereof and in the accompanying claims.

I claim:

1. A high frequency hybrid circuit for operation over a predetermined frequency range comprising a planar conductor, a loop conductor disposed above said planar conductor, a plurality of coaxial transmission lines each having an inner conductor coupled to said loop conductor and an outer conductor coupled to said planar conductor, said transmission lines being disposed in such a manner as to divide said loop conductor into a plurality of segments, one of said segments being of a one-half wavelength greater length at the highest operating frequency of said predetermined frequency range than the other of said segments and a conductor coupled to said planar conductor and located in spaced relation centrally of said loop conductor.

2. A high frequency hybrid circuit for operation over a predetermined frequency range comprising a planar conductor, an annular conductor disposed in spaced parallel relation to said planar conductor, a plurality of coaxial transmission lines each having an inner conductor and an outer conductor, the outer conductors being coupled to said planar conductor and the inner conductors being extended through said planar conductor and coupled to said annular conductor, said transmission lines being disposed in such a manner as to divide said annular conductor into a plurality of segments, one of said segments having a one-half wavelength greater length at the highest operating frequency of said predetermined frequency range than the other of said segments, and a conductive post coupled to said planar conductor, said post being disposed in spaced relation centrally of said annular conductor.

3. A hybrid circuit according to claim 2 which further includes a plurality of impedance matching transformers coupled between said inner conductors and said annular conductor.

4. A hybrid circuit according to claim 2 which further includes a plurality of matching stubs coupled between said annular conductor and said conductive post.

5. A high frequency hybrid circuit for operation over a predetermined frequency range comprising a planar conductor, an annular conductor in the form of an annular ring disposed in spaced parallel relation to said planar conductor, four coaxial transmission lines each having an inner conductor coupled to said annular ring and an outer conductor coupled to said planar conductor, said transmission line dividing said annular ring into four segments in such a manner as to provide a one-half wavelength greater length at the highest operating frequency of said predetermined frequency range for one of said segments than for the other of said segments, a conductive post coupled to said planar conductor, said post being disposed in spaced relation centrally of said annular ring and a conductive housing coupled to said planar conductor and said conductive post.

6. A device according to claim 5 which further includes means to adjust the capacitance between said planar conductor and said annular ring in the segment having the additional one-half wavelength greater length whereby the effective length of such segment may be adjusted.

7. A circuit according to claim 6 wherein said means to adjust the capacitance includes a tuning disk coupled to said housing, and means to vary the distance between said disk and said annular ring in the zone of the segment housing the additional one-half wavelength length.

8. A circuit according to claim 6 wherein said means to adjust the capacitance includes a tuning vane, and means to vary the area of said tuning vane disposed between said annular ring and said planar conductor in the zone of the segment having the additional one-half wavelength length.

9. A high frequency bridge circuit for operation over a predetermined frequency range comprising a planar conductor, an annular conductor in the form of an annular ring disposed in spaced parallel relation to said planar conductor, a plurality of coaxial transmission lines each having an inner conductor and an outer conductor, the outer conductors being coupled to said planar conductor and the inner conductors being extended through said planar conductor and coupled to said annular conductor, said transmission lines being disposed in such a manner as to divide said annular ring into a plurality of segments, one of said segments having a one-half wavelength greater length at the highest operating frequency of said predetermined frequency range than the other of said segments.

10. A circuit according to claim 9 which further includes means to vary the effective length of the segment having the additional one-half wavelength greater length.

11. A high frequency hybrid circuit for operating over a predetermined frequency range comprising a planar conductor, an annular conductor in the form of an annular ring disposed in spaced parallel relation to said planar conductor, four coaxial transmission lines each having an inner conductor coupled to said annular ring and an outer conductor coupled to said planar conductor, said transmission lines dividing said annular ring into four segments, three of which are equal in length to substantially one-quarter wavelength at the highest operating frequency of said predetermined frequency range and the other of said segments equal in length to substantially three-quarters of a wavelength at the highest operating frequency at said predetermined frequency range, a conductive post coupled to said planar conductor, said post being disposed in spaced relation centrally of said annular ring and means to vary the capacitance between said annular ring and said planar conductor in the zone of said three-quarter wavelength segment.

References Cited in the file of this patent

UNITED STATES PATENTS

| | | |
|---|---|---|
| 2,424,982 | Higgins | Aug. 5, 1947 |
| 2,445,895 | Tyrell | July 28, 1948 |
| 2,452,202 | Lindenblad | Oct. 26, 1948 |
| 2,593,120 | Dicke | Apr. 15, 1952 |
| 2,602,856 | Rumsey | July 8, 1952 |
| 2,734,170 | Englemann et al. | Feb. 7, 1956 |
| 2,749,521 | Englemann et al. | June 5, 1956 |
| 2,751,558 | Greig | June 19, 1956 |
| 2,760,169 | Englemann | Aug. 21, 1956 |

OTHER REFERENCES

Publication I, Kostriza, "Microstrip Components." Proceedirngs of I. R. E., December 1952, pp. 1658–1663.